May 16, 1961  E. WILDHABER  2,984,158
METHOD AND MEANS FOR CUTTING SPIRAL TEETH
Filed Jan. 3, 1956
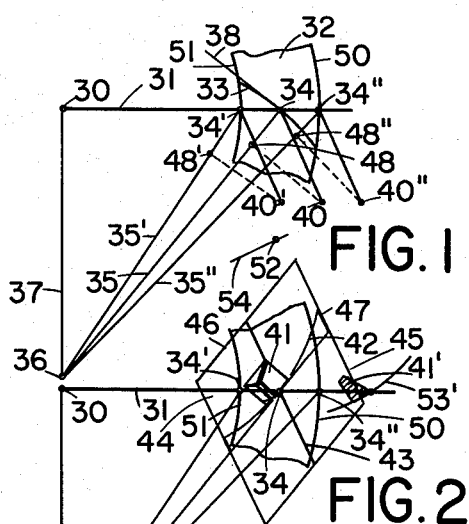
FIG. 1
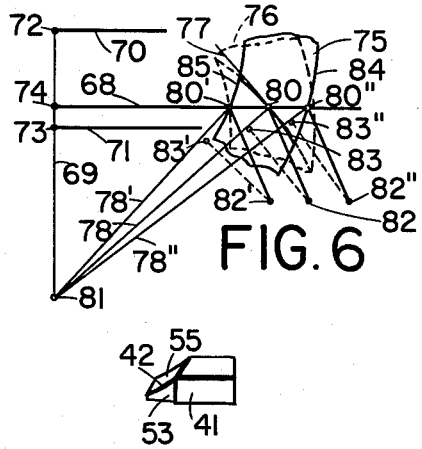
FIG. 6
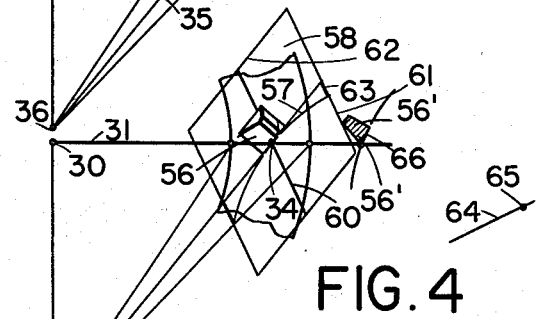
FIG. 2
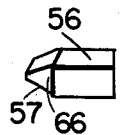
FIG. 3
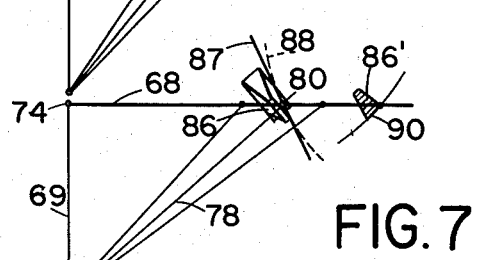
FIG. 4
FIG. 5
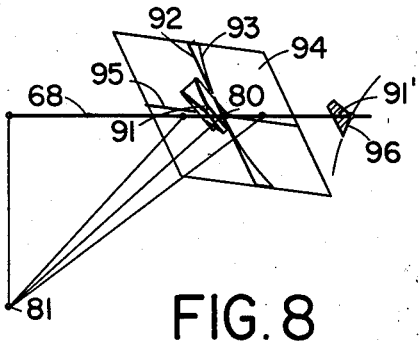
FIG. 7 FIG. 8
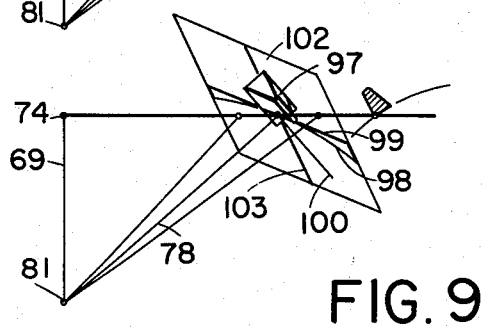
FIG. 9
INVENTOR:
Ernst Wildhaber

United States Patent Office 2,984,158
Patented May 16, 1961

2,984,158

METHOD AND MEANS FOR CUTTING SPIRAL TEETH

Ernest Wildhaber, Brighton, N.Y.

Filed Jan. 3, 1956, Ser. No. 557,151

13 Claims. (Cl. 90—8)

The present invention relates to the production of spiral teeth on gears, particularly on spiral bevel gears and on hypoid gears.

One object of the present invention is to provide a method and tools for accurately form-cutting both members of a pair of spiral bevel or hypoid gears, and of doing so in an efficient and productive manner.

A related object is to devise a method in which form-cutting tools are reciprocated in straight paths across the face of a gear blank while said gear blank is simultaneously turned on its axis in timed relation to the displacement of said tools, to produce spiral teeth.

The term spiral is meant to be a general curve extending about an axis at varying distances therefrom, at a distance which increases continuously from an inner end of the spiral to its outer end. It differs from a helix, that has a constant distance from an axis.

A further and important aim is to provide a method and tool of the said character, that permit to control the profile curvature along the length of the teeth. The profile curvature required in normal sections at different points varies along the teeth. On most spiral bevel and hypoid gears the profiles should be less curved at the outer or large end of the teeth than at the inner or small end. The invention permits to control the change of profile curvature lengthwise of the teeth, and thereby establishes a form-cutting method that can compare in quality with generating methods. Form-cutting processes can be made more productive than generating methods, and they also produce smoother fillets connecting the side profiles with the tooth bottoms.

In one aspect the present invention is a continuation of my application Serial No. 544,270, entitled "Gearing," filed November 1, 1955, Patent No. 2,930,248, issued March 29, 1960, which relates to the tooth shapes. The present application relates to one of the production processes therefor.

A further object is to devise a method for completing spiral teeth from solid gear blanks.

Other aims will appear in the course of the specification and in the recital of the appended claims.

In the drawings:

Fig. 1 is a diagram illustrative of the principles underlying the profile control attained with the present invention.

Fig. 2 is a view of the tangent plane of the contacting pitch surfaces of a pair of spiral bevel gears, showing a tool in its straight path across the gear face, said tool having a form-cutting edge so positioned that it produces tooth profiles of changing curvature. More curvature is produced at the inner end of the teeth than at their outer end.

Fig. 3 is a side view of the tool shown in Fig. 2.

Fig. 4 is a view like Fig. 2, but showing a tool for cutting the opposite side of the teeth.

Fig. 5 is a side view of the tool shown in Fig. 4.

Fig. 6 is a diagram similar to Fig. 1, but referring to hypoid gears. It is viewed at right angles to the line of contact of the pitch surfaces.

Figures 7, 8 and 9 are views like Fig. 6, also showing various tools in different positions.

Fig. 7 shows a form-cutting tool adapted to cut the longitudinally concave side of a hypoid pinion in a way that its normal pressure angle increases from the outer or large end of the teeth to their inner or small end, while also producing a profile curvature that increases from the outer end towards the inner end of the teeth.

Fig. 8 shows a tool giving the same pressure angle distribution as the tool of Fig. 7 on the longitudinally concave side of a hypoid pinion, while producing a profile curvature that decreases from the outer end towards the inner end of the teeth.

Fig. 9 refers to the longitudinally convex side of the pinion teeth. It shows a tool adapted to cut tooth surfaces whose normal pressure angle decreases from the outer end towards the inner end of the teeth, while producing a profile curvature that increases from the outer end towards the inner end of the teeth.

Bevel gear pairs with intersecting axes mesh in such a way that two conical surfaces moving with the two members of a pair roll on each other without sliding. These surfaces have a common apex at the point of intersection of the axes of the gear pair and are called the pitch surfaces. The tooth surfaces of each member intersect its conical pitch surface in curves or lines called the pitch lines. Contacting tooth surfaces have pitch lines that contact each other. They contact at points of the straight line of contact of the pitch surfaces. Mating pitch lines are related to each other as if printed from one pitch surface to the other.

The pitch lines can best be analyzed and described in the development of the pitch surfaces to a plane.

The drawing plane of Fig. 1 is such a plane. It is tangent to the pitch cones and centered at the apex 30 where the gear axes intersect. In this view the gear axes are projected into the line of tangency 31 of the conical pitch surfaces. This line will be called element. 32 denotes a portion of the developed pitch surfaces. The developed pitch line 33 is shown to intersect element 31 at a mean point 34. This is the point of contact of the pitch lines of the gears. As the gears rotate, this point of contact travels along element 31, from one end position 34' to the other end position 34".

The pitch lines can be considered described on the pitch cones by a point moving along element 31 while the gears rotate so that their pitch cones roll on each other without sliding. Conjugate or properly mating pitch lines are described regardless of how this describing point (34) moves.

Preferably, however, the describing point moves at a uniform rate when the gears turn uniformly. In other words, the displacement of the describing point and the turning angles of the gears are in direct proportion to each other. In this case the developed pitch line 33 is an Archimedean spiral. The normals 35', 35, 35" to the contacting pitch lines at all points 34', 34, 34" of element 31 all pass through a common point 36, according to a well known property of the Archimedean spiral. Point 36 lies on a line 37 perpendicular to element 31 and passing through apex 30.

The tooth tangents, such as tangent 38, are perpendicular to the corresponding normals (35).

The present invention utilizes the inclination of these normals to one another.

Point 40 lies either above or below the drawing plane of Fig. 1. Let us consider a line 34—40 that extends on both sides of the drawing plane. When such a line is moved with the pitch point describing the pitch lines, the line describes surfaces on the two rotating gear members. And these surfaces contact each other at the moving pitch point, while away from the pitch point they interfere with each other increasingly with increasing distance from the pitch point. They contact at the pitch point because the pitch lines themselves contact there.

To obtain tooth surfaces that contact also in the regions away from the pitch point, two describing lines should be used that have a common tangent at the pitch point, one line on one gear member, the other line on the mating gear member. These lines should have different curvature, corresponding to the profile curvature of the teeth. The profile should be convex on at least one member. It may be straight on one member and convex on the other member. Or it may be convex on both members.

Accordingly we have come a step closer to the exact solution by using a concave describing line or cutting edge on at least one member, to produce convex profiles thereon.

On exactly formed spiral teeth the profile curvature ordinarily should change lengthwise of the teeth. The required profile curvature depends on the cone distance of a considered point from apex 30, and on the profile inclination or pressure angle of the teeth. At a constant pressure angle and with pitch lines that are Archimedean spirals in development, the profiles should be increasingly curved the smaller the cone distance is. It should be more curved at point 34' than at point 34". And it should be increasingly curved with decreasing profile inclination or pressure angle.

In accordance with my invention two ways may be used for obtaining the required tooth-profile curvature lengthwise of the teeth with a constant form-cutting edge. One of these is a change of profile inclination so that a constant profile curvature is required. The other is a direct change of the tooth-profile curvature. These two ways can be used one at a time or both together. They may be used on the pinion only, or on the gear only, or on both the pinion and the gear.

This direct change will now be described.

*Variation of profile curvature*

Fig. 2 is a view taken in the same direction as Fig. 1. The drawing plane is the tangent plane of the contacting conical pitch surfaces containing apex 30. Tool 41 is shown in the mid-position of its cutting stroke along element 31. It contains a concavely curved cutting edge that passes through pitch point 34 and is shown extended at 42. The cutting-edge tangent at pitch point 34 lies in the normal plane that is perpendicular to the pitch line and contains normal 35. With this disposition the normal pressure angle is very nearly the same at both end points 34' and 34". Thus the profile curvature will have to be changed directly.

This is done with the position of the curvature plane of the cutting edge. The cutting edge, whether a circular arc or not, is represented very closely by its curvature circle in the immediate vicinity of the considered pitch point 34. The plane of the curvature circle contains the cutting-edge tangent and intersects the drawing plane here in a line 43. This curvature plane 44 is indicated by boundaries 45 parallel to trace 43 and boundaries 46 parallel to said tangent. At the boundaries 45 the extended edge 42 has a distance or ordinate 47 from the cutting edge tangent, measured in the horizontal direction of boundary 45.

The projected line 34—40 of Fig. 1 is shown parallel to trace 43, boundary 45 and ordinate 47. And its length is in a definite proportion to ordinate 47. In the describing motion the said line moves from one end position (34'—40') to the other end position (34"—40"). While it stays parallel to itself, it changes its inclination with respect to the normals 35', 35, 35". The projected points 40', 40, 40" of the drawing plane project to points 48', 48, 48" on the respective normals 35', 35, 35". And it is seen that the distances of these points from the respective pitch points varies. 34"—48" is smallest; 34'—48' is largest. The distances increase from the outer end 50 to the inner end 51 of the teeth.

Accordingly at any given vertical level the ordinate (47) of edge 42 projects deeper in normal direction beyond the tangent plane at the inner end 51 of the teeth than at the outer end 50. Hence the edge 42 produces a surface whose normal profile is increasingly curved from the outer end to the inner end of the teeth, as required.

A methematical way of effecting positions of the curvature plane as indicated would be to embody this plane as a cutting face. This generally results in impractical or even impossible cutting angles. According to my invention cutting faces other than planes are used to achieve the desired cutting angles. These cutting faces should contain the required cutting edge or its curvature circle. Spherical cutting faces are preferred on cutting teeth sharpened by regrinding their cutting faces. The required position of the curvature plane is achieved by a spherical cutting face when its sphere center has a normal projection to the curvature plane coinciding with the curvature center of the cutting edge. In other words the sphere center should lie on a line drawn through the curvature center at right angles to the curvature plane, as readily understood by those familiar with geometry.

Thus 52 is the sphere center of the spherical cutting face 53 of tool 41'. This tool, shown in section in Fig. 2, is identical with tool 41 and merely shown ahead of it. Sphere center 52 lies on a line 54 that passes through the curvature center of the cutting edge and is perpendicular to the curvature plane on tool 41'. Thus it appears at right angles to trace 43 of the parallel curvature plane of tool 41.

The intersection line of the spherical surface 53 with the pitch plane is a circular arc 53' centered at the projected sphere center 52. Any desired side rake may be achieved without effect on the curvature plane, by shifting center 52 along line 54. The side rake is increased by shifting center 52 to the right on line 54. It is decreased by shifting it to the left. It becomes negative at large shifts to the left, resulting in an obtuse cutting angle. When the sphere center is shifted infinitely far, the sphere becomes a plane, and the cutting angle is then so obtuse as to be impossible.

Tool or blade 41 is also shown in Fig. 3. It has a concavely curved form-cutting edge 42 formed at the intersection of a relieved side surface 55 with a convex spherical cutting face 53; convex because the curvature center of the cutting edge lies in the rear of tool 41.

The change of profile curvature along the teeth increases with increasing inclination of the curvature plane to the normal plane at mean point 34. The normal plane is perpendicular to the pitch line or tooth spiral and contains the normal 35. The inclination between said two planes is nearly the same as the angle between normal 35 and trace 43. It is preferably kept larger than thirty degrees.

Tool 41 describes and cuts the longitudinally concave side of the teeth of a spiral bevel pinion or gear, as it is reciprocated along element 31 across the face of a gear blank while the gear blank is simultaneously turned on its axis in direct proportion to the tool displacement. Its form-cutting edge 42 describes and cuts an entire tooth side in a single feed position.

Figures 4 and 5 relate to the opposite side of the teeth, to the longitudinal convex side. Tool 56 contains a concavely curved cutting edge shown extended at 57, that passes through pitch point 34 in the shown mean tool position along its path 31. The cutting edge tangent at 34 lies in the normal plane. The curvature plane 58 of edge 57 contains the said tangent and intersects the pitch plane or drawing plane in a trace 60, which here has the same inclination to normal 35 as trace 43 of Fig. 2. Plane 58 is shown bounded by lines 61 parallel to trace 60 and by lines 62 parallel to the cutting-edge tangent at 34. While this curvature plane appears in this view like the curvature plane 44 of Fig. 2, it is oppositely inclined to the drawing plane.

The concavely curved extended cutting edge 57 has a horizontal ordinate 63 at the boundary 61. As this ordinate is parallel to trace 60 and to projected line 34—40 of Fig. 1, its effect is the same as described for the ordinate 47 of Fig. 2, and as expressed by the distances 34'—48', 34—48, 34"—48" of Fig. 1. Its penetration beyond the tangent plane at the pitch point, in normal direction, increases from the outer end 50 of the teeth to their inner end 51. Tooth profiles are produced that are increasingly curved from the outer end to the inner end, in sections normal to the teeth. The effect is the same on both sides of the teeth.

The curvature center at point 34 of the cutting edge 57 here lies in front of tool 56. A line drawn through the curvature center at right angles to the curvature plane is indicated at 64 for tool 56'. The latter is shown in section and is identical with tool 56. The center 65 of the spherical cutting face 66 lies on this line 64, in such a position as to effect a suitable amount of side rake on the tool. The cutting face 66 is part of a concave spherical surface.

The tools 41 and 56, for cutting opposite sides of the teeth, thus have convex and concave spherical cutting faces respectively. The tools may be set on separate tool slides. Or they may be set on the same tool slide at different distances on element 31. Such spacing is feasible because the slide motion is uniform, that is at a constant proportion to the turning motion of the work piece.

Variation of pressure angle

A change of pressure angle or profile inclination may be attained without tilting the tool by using a different general direction of the cutting edge, that is by using a different direction of its tangent at mean point 34. This tangent then should be inclined to the normal plane at 34, while still lying in the tangent plane to the tooth surface.

If point 40 (Fig. 1) lies in this tangent plane, above or below the drawing plane, depending on the tooth side considered, line 34—40 represents a cutting-edge tangent that is inclined to the normal plane. It determines the tooth-tangent plane at the various positions along path 31. Thus the tangent plane at pitch point 34' is the plane connecting line 34'—40' with the pitch-line tangent at 34'. The latter is perpendicular to normal 35' and parallel to the projected line 40'—48'. The trigonometric tangent of the inclination of the tangent plane, that is of the normal pressure angle at 34', is the proportion of the distance 34'—48' to the distance of point 40' or 40 from the drawing plane. The pressure angle increases with increasing length 34'—48'. In the illustrated case the distance 34'—48' is larger than distance 34—48 and than distance 34"—48". The produced profile inclination or pressure angle increases from the outer end 50 to the inner end 51.

In such a case it may be unnecessary to effect a change of profile curvature along the teeth, as the increase in pressure angle towards the inner end can be made to offset the effect of the decrease of the cone distance.

The above conclusion applies to both sides of the teeth. On each of the two sides a cutting-edge tangent projecting into a line 34—40 results in an increase of the pressure angle from the outer end to the inner end of the teeth.

However, the two described ways of profile matching along the length of the teeth can also be combined.

While the tools 41 and 56 are shown cutting from the inner end 51 towards the outer end 50 of the teeth, the cutting direction can also be reversed.

Offset axes

When the axes of the gear pair are angularly disposed and offset, we are dealing here with hypoid gears. On hypoid gears it is also possible to have pitch surfaces contacting along a straight line, and pitch lines that contact each other at points moving along said straight line in direct proportion to the turning motion of the gears. These pitch surfaces are hyperboloids, described in detail in the above mentioned application. They do not purely roll on each other, but they also slide. The pitch lines extend in the direction of relative sliding at the points of contact. Mating pitch lines can also be considered printed from one pitch surface to the other.

While on spiral bevel gears with intersecting axes a point moving at any rate along the pitch element of contact describes correct pitch lines on the given pitch surfaces, and may describe pitch lines of large or of small spiral angle on the same pitch surfaces, this is not true with hypoid gears. To change the spiral angle of the pitch lines on hypoid gears we have to change the pitch surfaces. An increase in the pitch angle of the pinion increases the pinion spiral angle, provided that the pinion spiral angle is larger than the gear spiral angle, in accordance with established design. A decrease decreases the pinion spiral angle.

Fig. 6 is a diagram similar to Fig. 1, but referring to hypoid gears. It is a view at right angles to element 68 of the contacting pitch surfaces and at right angles to the line of centers 69. The latter is perpendicular to both the gear axis 70 and pinion axis 71 and intersects both axes, at points 72 and 73 respectively. Element 68 intersects line 69 at 74. The axes 70, 71 appear as parallel straight lines in this view.

A fragment of the pitch surface of the gear is indicated at 75. The pitch surface of the pinion crosses it at an angle. A fragment is shown in dotted lines 76.

Let $i$ denote the inclination of the pinion axis 71 to the drawing plane and to the direction of element 68; $p$ the shaft angle of the gear pair, that is the sum of the inclinations of the axes 70, 71 to the drawing plane; E the shaft offset 72—73. Then the offset $E_x=73-74$ amounts to $$E_x = \frac{1}{2}E\left[\frac{\sin p - \sin (p-2i)}{\sin p}\right]$$

as demonstrated in my application above referred to.

And for the usual case of right shaft angles, $p=90°$, $E_x=E_r$, $E_r=\frac{1}{2}E(1-\cos 2i)=E \sin^2 i$.

The pitch-line tangents at points of element 68 have a varying direction. 77 is one such tangent. These tangents lie in the respective tangent planes of the contacting pitch surfaces, which planes contain element 68 and are inclined to the drawing plane at varying angles. Thus the tangents do not lie in the drawing plane. They are however perpendicular to normals 78', 78, 78" lying in the drawing plane. These normals at the pitch points 80', 80, 80" all intersect at a point 81 of the line of centers 69.

The pitch-line tangent 77 extends in the direction of relative sliding of the gear pair, as do all other pitch-line tangents at the points of contact. This direction can be determined in known manner. The distance $B=74-81$ can be shown to amount to $$B = \frac{(E-E_x)\sin(p-i) + E_x m \sin i}{m \sin i - \sin (p-i)}$$

Herein $m$ denotes the tooth ratio $N/n$ of the gear and pinion respectively.

For the usual case of right shaft angles, $p=90°$, $B=B_r$, the equation becomes $$B_r = \frac{(E-E_x)\cos i + E_x\, m \sin i}{m \sin i - \cos i}$$

The hypoid gear diagram Fig. 6 is very similar to the bevel gear diagram Fig. 1, as regards the normals 78', 78, 78". To attain a change of pressure angle lengthwise of the teeth, the cutting-edge tangent at mean point 80 should be inclined to the normal plane at 80 that contains normal 78. It also lies in the tangent plane of the tooth surface. If 80—82 is such a tangent, with point 82 lying above or below the drawing plane of Fig. 6, the tangent plane of the tooth surface at other positions of the pitch point is determined by projecting the end point 82 to the normal plane. In this way points 83', 83, 83" are obtained of the intersection lines of the tooth-tangent planes and the normal planes at 80', 80, 80" respectively. The points 83', 83, 83" appear somewhat offset from the respective normals 78', 78, 78" because of the inclination of the normal planes to the vertical. As on bevel gears, the profile inclination or pressure angle increases with increasing distance of the vertical planes 82'—83', 82—83, 82"—83" from the respective pitch points 80', 80, 80".

With the assumed direction of the cutting-edge tangent 80—82 the normal pressure angle of the tooth surface produced by the cutting edge in its path along element 68 increases from the outer end 84 of the teeth to their inner end 85.

On hypoid gears the change of pressure angle lengthwise of the teeth has an added meaning. It affects the intimacy of tooth contact. Increased intimacy is attained when the (normal) pressure angle increases from the outer tooth end to the inner end on the longitudinally convex side of the teeth of the gear; and when the pressure angle decreases from the outer tooth end to the inner end on the longitudinally concave side of the gear. The gear is here understood to be the larger member of the gear pair, the member with teeth of smaller spiral angle. This showing has been described at length in my above-named application.

The control of the profile curvature lengthwise of the teeth is analogous to the control described for spiral bevel gears.

Variation of pressure angle and variation of curvature can be combined.

Fig. 7 illustrates such a combination. It is a view in the same direction as Fig. 6. Tool 86 has a cutting-edge tangent 87 at pitch point 80. It has a concavely curved cutting edge whose curvature plane is perpendicular to the drawing plane of Fig. 7, and appears projected into tangent 87. To make it visible, the cutting edge is also shown turned about its tangent and then appears as the dotted line 88. This cutting edge is to cut the longitudinally concave side of a pinion, that mates with the longitudinally convex side of the gear. The pinion lies chiefly above the drawing plane.

Tangent 87 has the same direction as line 80—82 of Fig. 6, point 82 lying here above the drawing plane. This disposition produces pressure angles that increase from the outer end (84) to the inner end (85) of the teeth. The horizontal ordinates of the cutting edge with respect to its tangent 87 are equally directed as the ordinates 47 of Fig. 2. And the effect is the same. The profile curvature of normal sections through the tooth surface increases from the outer end to the inner end of the teeth.

The curvature center of the cutting edge (88) is here in the rear of tool 86. This results in a convex spherical cutting face on a tool to be sharpened by regrinding its cutting face. The cutting face is shown at 90 on the advanced tool 86' shown in section.

Fig. 8 shows another tool 91 for cutting the longitudinally concave side of the pinion teeth. Its cutting-edge tangent 92 is identical with tangent 87 of Fig. 7, so that pressure angles are produced that increase from the outer end (84) to the inner end (85) of the teeth. But the curvature plane of the cutting edge 93 is here positioned to effect tooth-profile curvatures that decrease from the outer end to the inner end of the teeth. The curvature plane 94 of the cutting edge 93, at point 80, intersects the drawing plane in a trace 95. It is oppositely inclined to the tooth direction as compared with the trace of the curvature plane of Fig. 7. When this direction is introduced in diagram Fig. 6 or diagram Fig. 1, it will be seen that an opposite curvature effect is attained, and that the profile curvatures obtained decrease from the outer end to the inner end of the teeth. A concave spherical cutting face is indicated on the advanced tool 91'. It shows a slightly negative side rake to allow for the large hook or front rake.

Fig. 9 refers to the opposite side of the pinion teeth, to the longitudinally convex side. Tool 97 has a concave cutting edge 98 whose projected tangent 99 at point 80 is oppositely inclined to the pitch-line tangent 100 as compared with tangent 87 of Fig. 7. When this direction is introduced to diagram Fig. 6 or Fig. 1, it is seen that this direction causes the pressure angles to decrease from the outer end (84) of the teeth to their inner end (85).

The curvature plane 102 of the cutting edge 98 intersects the drawing plane in a trace 103 that is equally directed as trace 60 of Fig. 4, and has the same effect. The curvature produced in normal sections of the tooth surface increases from the outer end to the inner end of the teeth.

It is seen that in the described way the curvature distribution and the pressure angle distribution can be controlled at will.

In the procedures as described teeth are obtained that have approximately the same depth at both ends of the teeth. Teeth of tapering depth can be obtained by slightly modifying the cutting direction, as customary in the art.

One such modified procedure uses straight cutting edges on one member of the gear pair. On that member a motion along the straight cutting edge may be geometrically added to the tool motion along the pitch element. In this way the direction of the tooth bottom is altered to obtain the desired tapering tooth depth, without in any way disturbing the full accuracy of the process. The other member of the gear pair retains its tooth bottom at a constant distance from the pitch line.

An ease-off at the tooth ends may also be attained by slight alterations customary in the art.

I claim:

1. The method of form-cutting a side surface of a spiral tooth so as to produce a profile curvature on the tooth increasing from one end of the tooth to the other end in sections normal to the tooth direction, which comprises positioning a curved form-cutting edge so that in the mean cutting position the curvature plane at the mean cutting point of said cutting edge is angularly inclined, in accordance with the lengthwise increase in profile curvature, to a plane which extends in the direction of said cutting edge and which is normal to the tooth surface at said point, and describing said entire side surface in a single pass with said cutting edge by moving said cutting edge across the face of a gear blank while turning said gear blank on its axis, said two motions being so timed that a tooth spiral is produced whose inclination to the path of said cutting edge is larger at one end of the teeth than at the other end.

2. The method of form-cutting a side surface of a spiral tooth so as to produce tooth profile curvatures on the tooth increasing from one end of the tooth to the other in sections normal to the longitudinal direction of the tooth, which comprises providing a tool having a curved form-cutting edge formed at the intersection of a lateral tool surface with a spherical cutting face, the curvature plane of said cutting edge at its mean point of cut being angularly inclined to said cutting face at said point, positioning said tool so that said curvature plane is inclined, in accordance with the lengthwise increase in profile curvature, to a normal plane which is perpendicular to the longitudinal direction of the tooth in the mean cutting position, and describing said entire side surface in a single pass with said cutting edge by moving said cutting edge across the face of a gear blank while turning said gear blank on its axis, said two motions being so timed that a tooth spiral is produced whose inclination to the path of said cutting edge is larger at one end of the teeth than at the other end.

3. The method of cutting a side surface of a spiral tooth, which comprises providing a tool having a concavely curved form-cutting edge formed at the intersection of a lateral tool surface with a spherical cutting face, and describing said entire side surface in a single pass with said cutting edge by moving said cutting edge in an approximately straight path across the face of a gear blank while turning said gear blank on its axis, said two motions being timed to be directly proportional to one another.

4. The method of form-cutting a side surface of a spiral tooth so as to produce tooth profile curvatures on the tooth increasing from one end to the other end in sections normal to the longitudinal direction of the tooth, which comprises providing a tool having a curved form-cutting edge formed at the intersection of a lateral tool surface with a curved cutting face, positioning said tool so as to incline the mean curvature plane of said cutting edge, in accordance with the lengthwise increase in profile curvature, to a plane perpendicular to the longitudinal direction of the tooth at the mean cutting position, and describing said entire side surface in a single pass with said cutting edge by moving said cutting edge in an approximately straight path across the face of a gear blank while effecting a turning motion between said edge and said gear blank about the axis of the gear blank, said two motions being timed to be directly proportional to one another, so that a tooth spiral is produced whose inclination to the path of said cutting edge is larger at the outer end of the teeth than at their inner end.

5. The method of cutting the tooth sides of a pair of gears having angularly disposed axes with form-cutting tools, which comprises cutting each member of said pair by reciprocating a form-cutting tool in an approximately straight path across the face of a gear blank to effect cutting passes, while turning said blank on its axis, said two motions being timed to be directly proportional to each other, effecting relative feed movement between the tool and the blank to cut progressively deeper into the blank and applying the final cut to each entire tooth side in a single cutting pass of the tool, the tool used in cutting at least one member of said pair of gears having a concavely curved cutting edge, and a curved cutting face.

6. The method of cutting the tooth sides of a pair of hypoid gears with form-cutting tools, which comprises cutting each member of said pair by reciprocating a tool in an approximately straight path across the face of a gear blank while turning said blank on its axis in timed relation thereto, to effect cutting passes, the path of the mean cutting point of said tool being angularly disposed to and offset from the axis of said gear blank, effecting relative feed movement between the tool and blank to cut progressively deeper into the blank, and applying the final cut to each entire tooth side in a single cutting pass of the tool, the tool used in cutting at least one member of said pair of gears having a concavely curved cutting edge.

7. The method of cutting one member of a pair of gears having angularly disposed axes, which comprises spacing a plurality of tools about the axis of a gear blank to act on said gear blank from at least three sides, simultaneously reciprocating said tools in approximately straight paths across the face of said gear blank while turning said gear blank on its axis in proportion to the displacement of said tools, withdrawing said gear blank after each cutting stroke in the direction of its axis and advancing it to cutting position before each cutting stroke, feeding said gear blank depthwise in the direction of its axis, and applying the final cut in a single position of feed.

8. The method of cutting one member of a pair of gears having angularly disposed axes, which comprises providing two sets of reciprocatory tools adapted to cut the two opposite sides of the teeth of a gear blank respectively, each set comprising more than two tools, disposing all of the tools of each of said sets about the axis of a gear blank so that all of the tools of each set are equiangularly spaced from each other except two adjacent tools, reciprocating said tools across the face of said gear blank to effect cutting and return strokes, turning said gear blank on its axis between cutting strokes so that each tool on its successive cutting strokes enters a different tooth space of the blank but a tooth space adjacent to that in which it has previously cut, effecting depthwise feed between said tools and gear blank so that said tools cut deeper from stroke to stroke during said feed and so that one of said two adjacent tools of each set takes a smaller depth cut than the other tools of the same set, said one tool of each set having its side cutting edge offset laterally with reference to the other tools of the same set so as to effect a finishing cut, and finishing opposite sides, respectively, of said teeth with said one tool of each set by continuing the reciprocating cutting strokes of the tools after ending said depthwise feed.

9. A form-cutting tool for cutting a spiral tooth on a gear blank so that the tooth profile changes along the tooth length in cross-sections perpendicular to said length, while the tool traverses the face of the gear blank in a path of varying side clearance, said tool having a concavely curved cutting edge and a cutting face other than a plane, the curvature plane of said cutting edge at a mean point being angularly inclined to said cutting face at said point at an angle of at least twelve degrees.

10. A form-cutting tool for cutting a spiral tooth on a gear blank so that the tooth profile changes along the tooth length in cross-sections perpendicular to said length, while the tool traverses the face of the gear blank in a path of varying side clearance, said tool having a concavely curved cutting edge formed at the intersection of a side surface with a concave spherical cutting face, the curvature plane of said cutting edge at a mean point being inclined to the cutting face at said point by an angle of at least thirty degrees.

11. A form-cutting tool for cutting a spiral tooth on a gear blank so that the tooth profile changes along the tooth length in cross-sections perpendicular to said length, while the tool traverses the face of the gear blank in a path of varying side clearance, said tool having a concavely curved cutting edge formed at the intersection of a side surface with a convex spherical cutting face, the curvature plane of said cutting edge at a mean point being inclined to the cutting face at said point by an angle of at least thirty degrees.

12. The method according to claim 1, wherein the cutting face of the tool is other than a plane, and said cutting face is inclined to the curvature plane.

13. The method of form-cutting the longitudinally concave side of a spiral tooth of a gear blank so as to produce profile curvatures on the tooth increasing from one end of the tooth to the other end in sections normal to the longitudinal direction of said tooth, which comprises positioning a tool, which has a concavely curved form-cutting edge and a convex spherical cutting face, relative to said gear blank so that in its mean cutting position the curvature plane of said cutting edge at a mean point thereof is inclined to the tooth surface normal at said point and so that said convex spherical cutting face is also inclined to said normal but at a smaller angle than said curvature plane, and effecting motion in a path across the gear blank between said tool and said blank while turning the blank on its axis in time with said motion, to produce a tooth spiral whose inclination to said path is larger at one end of the tooth than at the other end thereof.

References Cited in the file of this patent

UNITED STATES PATENTS

| | | |
|---|---|---|
| 676,226 | Fellows | June 11, 1901 |
| 1,436,938 | Brandenberger | Nov. 28, 1922 |
| 1,625,722 | Harbeck | Apr. 19, 1927 |
| 1,725,431 | Uhlich | Aug. 20, 1929 |
| 2,324,182 | Wildhaber | July 13, 1943 |
| 2,339,679 | Carlsen | Jan. 18, 1944 |
| 2,358,442 | Carlsen | Sept. 19, 1944 |